United States Patent [19]

Kondo et al.

[11] Patent Number: 4,652,760

[45] Date of Patent: Mar. 24, 1987

[54] DATA COLLECTOR FOR USE WITH SCINTILLATION CAMERA OR THE LIKE

[75] Inventors: Shoji Kondo; Tadashi Taniguchi, both of Chiba, Japan

[73] Assignee: Nippon Gijutsu Boeki Co., Ltd., Japan

[21] Appl. No.: 739,196

[22] Filed: May 30, 1985

[30] Foreign Application Priority Data

Sep. 6, 1984 [JP] Japan .................................. 59-117475

[51] Int. Cl.$^4$ .......................... G01T 1/17; G06K 9/36
[52] U.S. Cl. .................................. 250/363 S; 250/369; 364/414; 382/44
[58] Field of Search ............ 250/369, 363 SR, 370 G, 250/370 H, 370 I, 374, 385 R, 334, 332, 330; 382/44, 45, 46, 47; 365/231; 364/414

[56] References Cited

U.S. PATENT DOCUMENTS

| | | | |
|---|---|---|---|
| 3,976,982 | 8/1976 | Eiselen | 382/44 |
| 4,267,573 | 5/1981 | Chaikin et al. | 382/46 |
| 4,533,947 | 8/1985 | Smith | 358/111 |

OTHER PUBLICATIONS

Sebastian Genna, Sing-Chin Pang, Andrew Smith, "Digital Scintigraphy: Principles, Design and Performance", *Journal of Nuclear Medicine*, vol. 22 (1981), pp. 365-371.

Robert L. Richardson, F. Deaver Thomas, "An Adjustable Zoom-Mode Gain Control for Computerized Gamma-Camera Systems", *Journal of Nuclear Medicine*, vol. 21 (1980), pp. 790-792.

*Primary Examiner*—Janice A. Howell
*Assistant Examiner*—Constantine Hannaher
*Attorney, Agent, or Firm*—Gerald J. Ferguson, Jr.; Michael P. Hoffman; Ronni S. Malamud

[57] ABSTRACT

A data collector for use with a scintillation camera or the like where the camera includes (a) a radiation detector which generates X and Y position signals at least each time a detection event occurs (b) an A/D converter respectively converting the X and Y position signals to digital signals, (c) a converter responsive to the X and Y position signals for respectively converting the position signals to X and Y address signals in accordance with at least a predetermined ratio, (d) X and Y address registers for respectively receiving the X and Y address signals, and (e) a two-dimensional image storage memory responsive to the X and Y address signals for storing data corresponding to the detected event at a memory location within the image storage memory determined by the X and Y address signals. The converter comprises at least one memory matrix responsive to one of the A/D converters for storing conversion data where the memory matrix comprises at least $2^n$ storage locations where each location is at least n bits long and where the output of the A/D converter is at least n bits long, the magnitude of the output of the A/D converter being used as an address to access the conversion data stored at that address and apply the accessed conversion data as the address signal to the address register associated with the A/D converter.

19 Claims, 4 Drawing Figures

DATA COLLECTOR FOR USE WITH SCINTILLATION CAMERA OR THE LIKE

BACKGROUND OF THE INVENTION

This invention relates to a data collector for use with a scintillation camera employed in medical diagnosis or the like and more particularly to such a data collector capable of converting the size of the collection matrix of an image memory for collecting distribution image data and the conversion of many like kinds of collecting matrices.

As shown in FIG. 2, a conventional scintillation camera may be used to detect the distribution of a radioisotope injected in a body, for instance, the human body, using a radiation detector 1, collect the distribution image data in an image memory of a data collector 3 by means of the control of a CPU (Central Processing Unit) 2 and display the distribution image on a display unit 4 such as a cathode-ray tube.

The conventional data collector 3 comprises, as shown in FIG. 3, X- and Y-direction A/D converters 5, 5', converter switches $S_1$–$S_3$, $S_1'$–$S_3'$, an X address register 6 and a Y address register 6', a two-dimensional image memory 7 and an increment circuit 8. The radiation detector 1 detects radiations such as γ rays emitted from an object being examined and produces position signals x, y simultaneously with an unblanking signal u indicating that the incident γ ray has a predetermined amount or more of energy, the position signals x, y being held and respectively converted into digital signals by the A/D converters 5, 5' when the unblanking signal u is applied thereto. The X- and Y-direction position data Dx, Dy are respectively applied to X address register 6 and Y address register 6' of the large memory 7, which has a two-dimensional collection matrix, through the converter switches $S_1$–$S_3$, $S_1'$–$S_3'$. The distribution image data is then collected in the image memory 7 by reading out the data in the memory location determined by the addresses stored in registers 6, 6', using increment circuit 8 to add one to the data that has been read out, and then writing the incremented data back to the same address determined by the contents of registers 6, 6'.

In the above collection of distribution image data, conversion of the size of the collection matrix is implemented by effectively rendering the distribution image data coarse. That is, it sometimes is necessary to decrease the capacity of image memory 7 so that a plurality of distribution images may be collected in image memory 7. This size conversion of the collection matrix has heretofore been carried out as follows. As shown in FIG. 4 (the X direction only will be described), assuming the output of A/D converter 5 is, for instance, set at 6 bits ($2^0$–$2^5$), position data Dx is applied to X address register 6, which has six address bits ($2^0$–$2^5$), through one of the three converter switches $S_1$–$S_3$.

The first converter switch $S_1$ is operated when image memory 7 is to be completely filled with the collected data. Assuming the two-dimensional collection matrix of the image memory 7 is a 64×64 matrix, the output of 6 bits ($2^0$–$2^5$) of A/D converter 5 is applied to the six address bits ($2^0$–$2^5$) of X address register 6 at a 1:1 ratio. When a 32×32 matrix is used for data collection in a ¼ area of image memory 7, second converter switch $S_2$ is operated to connect the output of the upper rank 5 bits ($2^1$–$2^5$) of the A/D converter 5 with the lower rank 5 bits ($2^0$–$2^4$) of X address register 6 at a 1:½ ratio. Moreover, when a 16×16 matrix is used for data collection in a 1/16 area of the image memory, the third converter switch $S_3$ is operated to connect the output of the upper rank 4 bits ($2^2$–$2^5$) with the lower rank 4 bits of X address register 6 at a 1:¼ ratio. Similar connections are provided in the Y direction through the converter switches $S_1'$–$S_3'$. Unchanged, ½ or ¼ conversion has thus been applied to the collection matrix of image memory 7.

In the conventional data collector, however, the size conversion of the collection matrix requires the above converter switches for effecting the conversion ratio. Accordingly, a number of converter switches are present on the address line extending from A/D converters 5, 5' to address registers 6, 6', making the circuit complicated. Moreover, although ½, ¼, ⅛ . . . conversions are possible in each of the X and Y directions, ⅓, 1/5 . . . conversions are unavailable and thus the number of conversion ratios is limited. Furthermore, the polarity of the distribution image data in both the X and Y directions cannot be inverted.

SUMMARY OF THE INVENTION

It is a primary object of the present invention to solve the above problems.

According to the present invention, these problems and similar problems can be solved by respectively providing X and Y matrix converting memories between the X- and Y-direction A/D converters and the X and Y address registers, the matrix converting memories having stored therein conversion data whereby the magnitude of the output of each A/D converter is used as an address to access conversion data corresponding to that magnitude of the output, the accessed conversion data then being applied to its associated address register to thus effect the conversion (including inversion) of the position data outputted by each A/D converter.

Other objects and advantages of this invention will be apparent from a reading of the following specification and claims taken with the drawing.

DETAILED DESCRIPTION OF PREFERRED EMBODIMENTS OF THE INVENTION

Figure 1:
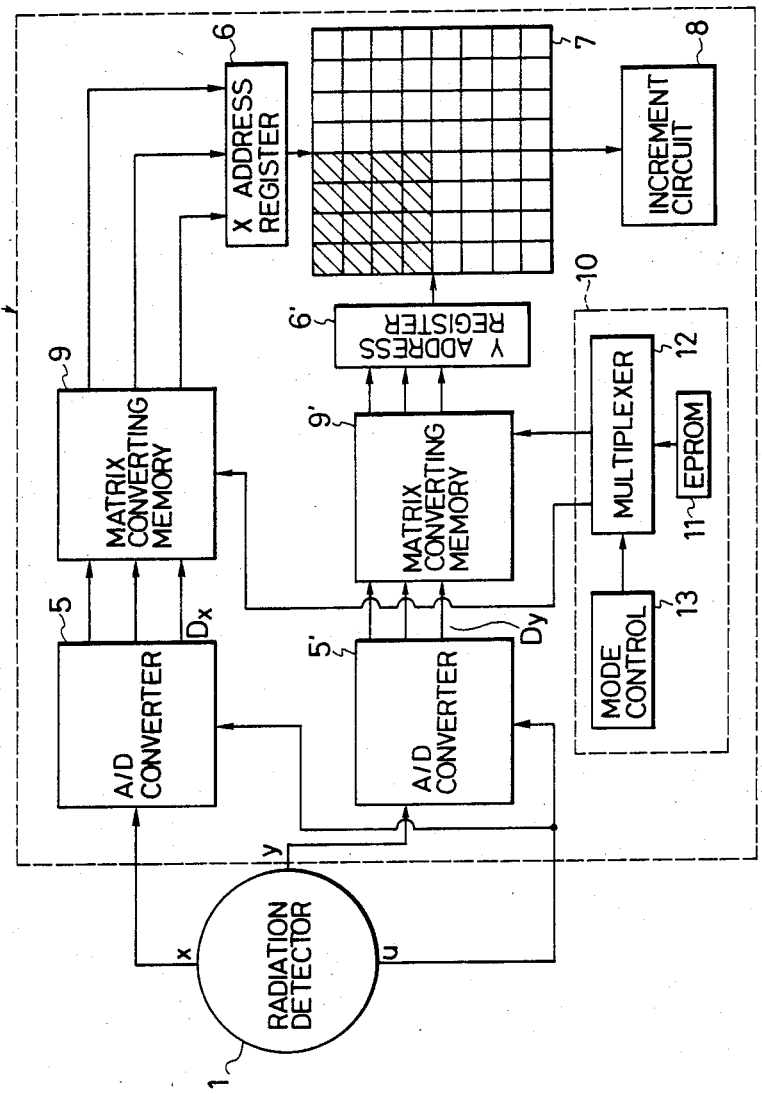
FIG. 1 is a block diagram illustrating an illustrative data collector for use with a scintillation camera or the like in accordance with the present invention.
Figure 2:
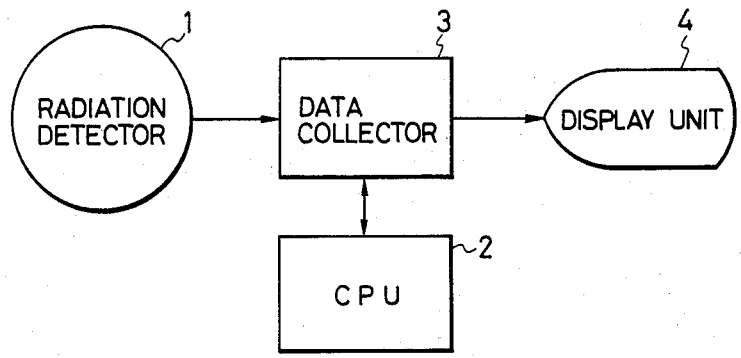
FIG. 2 is a schematic block diagram of a prior art scintillation camera.
Figure 3:
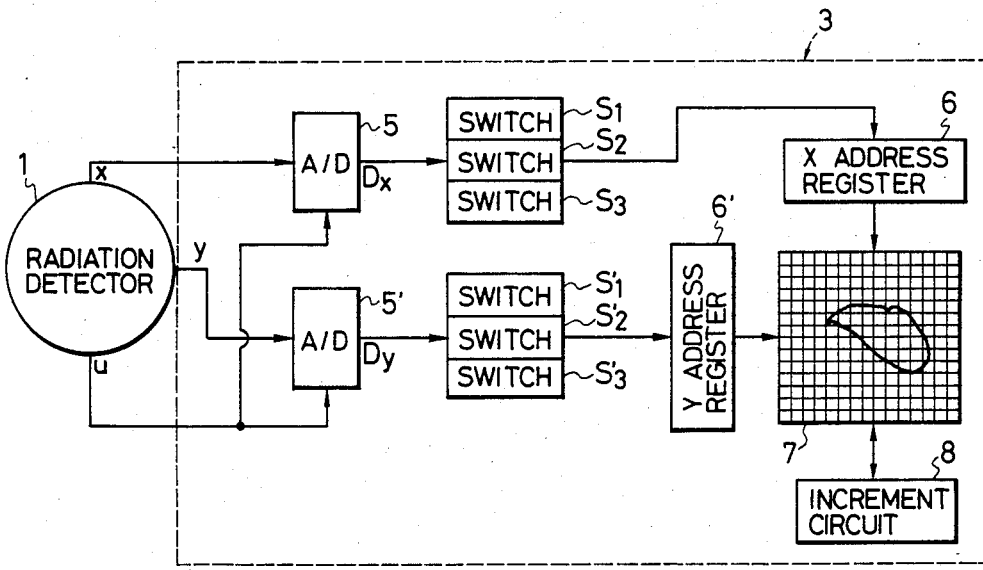
FIG. 3 is a block diagram of a prior art data collector for use with a scintillation camera.
Figure 4:
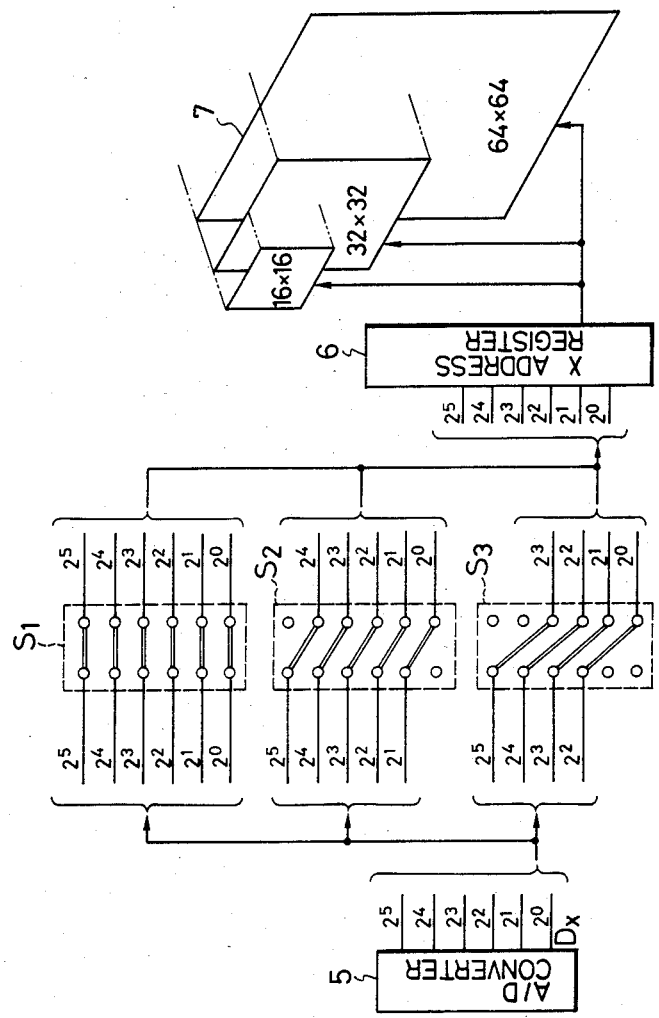
FIG. 4 is a schematic diagram illustrating a conventional collection matrix conversion mode.

Reference should be made to the drawing where like reference numerals refer to like parts.

FIG. 1 is a block diagram of a data collector 3' of a scintillation camera embodying the present invention. The data collector 3' comprises X- and Y-direction A/D converters 5, 5', X and Y matrix converting memories 9, 9', X address register 6', two-dimensional image memory 7 and increment circuit 8.

The X- and Y-direction A/D converters 5, 5' convert X- and Y-direction position signals x, y outputted from radiation detector 1 into digital signals. The radiation detector 1 detects radiations such as γ rays emitted from an object being examined and produces position signals x, y simultaneously with an unblanking signal u indicating that the incident γ ray has a predetermined amount or more of energy, the position signals x, y being held and respectively converted into digital signals by the A/D converters 5, 5', when the unblanking signal u is applied thereto.

X- and Y-directional position data Dx, Dy outputted from A/D converters 5, 5' are respectively utilized to address the X and Y matrix converting memories 9, 9'. A conversion data source 10 writes conversion data into matrix converting memories 9, 9'. The conversion data is applied to registers 6 and 6' depending on which memory locations are addressed by the outputs of A/D converters 5, 5' to either change the matrix size of the distribution image data collected in image memory 7 or invert the position data Dx, Dy outputted from converters 5, 5'.

As stated above, the converted position data outputted from matrix converting memories 9, 9' are respectively inputted to X address register 6 and Y address register 6' where they specify the addresses of the position data in image memory 7. The image memory 7 is provided with a two-dimensional collection matrix such as an 8×8 matrix, on which image data, derived from the distribution of γ rays emitted from the object being examined, is collected. The data collection is implemented by reading out the data in the memory location determined by the addresses stored in registers 6, 6' using increment circuit 8 to add one to the data that has been read out, and then writing the incremented data at the same address determined by the contents of registers 6, 6'.

The operation of matrix converter memories 9, 9' will now be described. Assuming the position data outputted from each of A/D converters 5, 5' has 3 bits in both the X and Y directions, the operation in the X direction only will be explained for brevity, it being assumed the data are collected in a 8×8 matrix image memory 7. It is also assumed the conversion data shown in the following Table has been stored in the X matrix converting memory 9.

| Input address | Conversion Data | | | |
|---|---|---|---|---|
| | 8 × 8 matrix | 4 × 4 matrix | 2 × 2 matrix | Inversely polarized (4 × 4) |
| 0 | 0 | 0 | 0 | 3 |
| 1 | 1 | 0 | 0 | 3 |
| 2 | 2 | 1 | 0 | 2 |
| 3 | 3 | 1 | 0 | 2 |
| 4 | 4 | 2 | 1 | 1 |
| 5 | 5 | 2 | 1 | 1 |
| 6 | 6 | 3 | 1 | 0 |
| 7 | 7 | 3 | 1 | 0 |

The position data Dx outputted from the A/D converter 5 is employed to address one of the address 0–7 of matrix converting memory 9, depending on the number of bits. When the distribution image data is to be completely collected in image memory 7, the 8×8 matrix is designated. This, the conversion data of 0, 1, 2 . . . 7 are stored at the addresses of 0, 1, 2 . . . 7 respectively in the matrix converting memory as shown in the Table and the output of 3 bits of the A/D converter 5 is allowed by matrix converting memory 9 to remain at 3 bits and the complete 8×8 area of matrix is accessible in the combined X and Y directions. Accordingly, the distribution image data are fully collected in the image memory. The foregoing may be illustrated by assuming the output of converter 5 is 110 (6). Thus is used to access input address 110 of matrix 9 whereby the memory contents (110) at this address are applied to the 3 bits of register 6 to thereby effect a 1:1 conversion.

If a 4×4 matrix is designated, the upper left portion of image memory 7 may be used as the 4×4 matrix for data collection, this portion being indicated with slanting lines. As shown in the Table above, the conversion data of 0, 1, 2 and 3 are stored at the addresses of [0, 1], [2, 3], [4, 5] and [6, 7] of matrix converting memory 9, respectively. The output of 3 bits of the A/D converter 5 is thus effectively converted to 2 bits of data by matrix converting memory 9 and the area of the upper left 4×4 matrix of the image memory is accessed in the combined X and Y directions. Consequently, a conversion of ½ is effected for the collection matrix of the image memory 7. The foregoing may be illustrated by assuming again the output of converter 5 is 110 (6). Again input address 110 will be accessed. However, the contents at this location is now 011 (3) whereby 011 is applied to the 3 bits of register 6 to thereby effect the ½ conversion. Note the foregoing conversion effectively corresponds to that of the prior art in that upper rank bits of the output of the A/D converter 5 are effectively applied to lower rank bits of the register 6; however, the circuitry in the path between converter 5 and register 6 for effecting the conversion is significantly simplified.

A 2×2 matrix may be implemented where the upper left portion of image memory 7 may be used as the 2×2 matrix for data collection. At this time, as shown in the Table above, the conversion data of 0 and 1 are stored at the addresses of [0, 1, 2, 3] and [4, 5, 6, 7] of matrix converting memory 9, respectively. The output of 3 bits of A/D converter 5 is then converted to the data of 1 bit by the matrix converting memory and the area of the upper left 2×2 matrix of the image memory 7 is accessed in the combined X and Y directions. Accordingly, a conversion of ¼ is effected for the collection matrix of the image memory 7.

Inverse polarity may also be implemented to invert the polarity of data collection in the image memory 7 with respect to the output of A/D converter 5. Assuming the converted matrix size to be a 4×4 matrix, as shown in the above Table, the conversion data of 3, 2, 1 and 0 are stored at the addresses of [0, 1], [2, 3], [4, 5] and [6, 7] of the matrix converting memory 9, respectively, whereby decreasing conversion data may be stored as the addresses increase. Thus the polarity of the collection data in the X direction can be inverted and in the same manner, that of the collection data in the Y direction can be inverted.

The conversion of the collection matrix is not limited to the above-described ½, ¼ and the like. If, for instance, the conversion data of 0, 1 and 2 are respectively written at the addresses of [0, 1, 2], [3, 4, 5] and [6, 7] of the matrix converting memory 9, a conversion of about ⅜ will be effected for the collection matrix of image memory 7. Thus conversion data written at every address having an odd number will make possible conversions of about ⅓, 1/5 and so on. With respect to the inversion of polarity of the collecting data, inversely polarized data may or may not be written in the matrix converting memories 9, 9'. Moreover, only the X or Y direction may be inverted or both the X and Y directions can be inverted. Although an image memory 7 having a 8×8 collecting matrix is shown in FIG. 1, not only that matrix but also 16×16, 32×32 and 64×64 matrices are equally applicable to the present invention.

The various conversion data applied to memories 9 and 9' are provided from conversion data source 10, which may be implemented in various ways. For example, the circuitry of the type shown in FIGS. 13–40, page 424 of "Pulse and Digital Circuits", J. Millman et. al., McGraw Hill Book Company, Inc., New York, 1956 may be implemented to generate the conversion data.

The conversion data source 10, as shown in FIG. 1 may also comprise an EPROM 11 or the like where the number of memory locations may correspond to the number of memory locations in each of the matrix converting memories 9 and 9'. Stored in the first three bits of each memory location would be the conversion data for the 8×8 matrix. Stored in the next three bits of each location would be the conversion data for the 4×4 matrix while stored in the next three bits of each location would be the conversion data for the 2×2 matrix. Inversion data for the various matrix sizes would also be allotted three corresponding bits in each of the memory locations. The EPROM 11 is connected to a multiplexer 12, the multiplexer being controlled by a mode control 13. Hence, assuming the 4×4 conversion is desired, an appropriate button (not shown) or the like at the mode control would be depressed to actuate the multiplexer 12 to select the second three bits of each location of the EPROM for application of these bits to the respective memories 9 and 9'.

Conversion data source 10 may also be included within CPU 2 whereby the conversion data would be applied to the memories 9, 9' under program control.

It should also be noted the EPROM 11 may be employed in place of one or both of the matrix converting memories 9, 9'. In this case the multiplexer 12 would also be in the address lines disposed between the A/D converters 5, 5' and X and Y address registers 6, 6'. Hence, the circuitry of FIG. 1 may be more advantageous in certain circumstances in that, the amount of circuitry disposed in the address lines is kept to a minimum.

Because matrix converting memories 9, 9' are provided between X- and Y-directional A/D converters 5, 5' and address registers 6, 6', the conversion of the collection matrix of image memory 7 to a suitable ratio is made possible by using conversion data written into the matrix converting memories 9, 9'. In contrast to conventional collectors, circuitry may accordingly be simplified without providing a number of converter switches on the address line extending between A/D converters 5, 5' and address registers 6, 6'. Moreover, the collection matrix conversion ratio can simply be altered by externally rewriting the conversion data of the matrix converting memories 9, 9'. Moreover, althought the collection matrix conversion ratio has been illustrated as $\frac{1}{2}, \frac{1}{4}, \frac{1}{8} \ldots$, the conversion data written to matrix converting memories 9, 9' makes possible conversions of about $\frac{1}{3}$, 1/5 ... and thus an increase in the number of conversion ratios of the collection matrix. The polarity of the distribution image data can also be inverted in terms of the X and Y directions and this further improves the versatility of medical diagnosis as a whole by means of scintillation cameras.

It is to be understood that the above detailed description of the various embodiments of the invention is provided by way of example only. Various details of design and construction may be modified without departing from the true spirit and scope of the invention as set forth in the appended claims.

What is claimed is:

1. In a data collector for use with a scintillation camera or the like where the camera includes (a) a radiation detector which generates X and Y position signals at least each time a detection event occurs (b) A/D means for respectively converting said X and Y position signals to digital signals, (c) converter means responsive to said X and Y position signals for respectively converting said position signals to X and Y address signals in accordance with at least a predetermined ratio, (d) X and Y address registers for respectively receiving said X and Y address signals, and (e) a two-dimensional image storage memory responsive to said X and Y address signals for storing data corresponding to said detected radiation at a memory location within said image storage memory determined by said X and Y address signals, the improvement comprising said converter means comprising at least one memory matrix responsive to one of said A/D means for storing conversion data where said memory matrix comprises at least $2^n$ storage locations where each location is at least n bits long and where the output of said A/D means is at least n bits long, the magnitude of said output of the A/D means being used as an address to access the conversion data stored at that address and apply the accessed conversion data as said address signal to the address register associated with said one A/D means.

2. The improvement as in claim 1 where said predetermined ratio is one so that said conversion data equals the magnitude of the output of the A/D means.

3. The improvement as in claim 2 where said image storage memory has $2^n \times 2^n$ memory locations and is completely filled by the data stored therein.

4. The improvement as in claim 1 where said predetermined ratio is 1/p where p=1, 2, 3, . . . .

5. The improvement as in claim 4 where p=1, 3, 5, . . .

6. The improvement as in claim 4 where p=2, 4, 6, . . .

7. The improvement as in claim 1 where said conversion data effects an inversion of at least one of the X and Y position signals such that as the magnitude of the output from at least one of the X and Y A/D means increases, the corresponding address signal decreases in magnitude.

8. The improvement as in claim 7 where said inversion is applied to both said X and Y position signals.

9. The improvement as in claim 1 including means for writing said conversion data into said memory matrix.

10. The improvement as in claim 1 where said detection event occurs each time the radiation detector detects a radiation which exceeds a predetermined threshold.

11. In a data collector for use with detection apparatus where the apparatus includes (a) a detector which generates X and Y position signals at least each time a detection event occurs, (b) A/D means for respectively converting said X and Y position signals to digital signals, (c) converter means responsive to said X and Y position signals for respectively converting said position signals to X and Y address signals in accordance with at least a predetermined ratio, (d) X and Y address registers for respectively receiving said X and Y address signals, and (e) a two-dimensional image storage memory responsive to said X and Y address signals for storing data corresponding to said detection event at a memory location within said image storage memory determined by said X and Y address signals, the improvement comprising said converter means comprising at least one memory matrix responsive to one of said A/D means for storing conversion data where said memory matrix comprises at least $2^n$ storage locations where each location is at least n bits long and where the output of said A/D means is at least n bits long, the magnitude of said output of the A/D means being used as an address to access the conversion data stored at that address and apply the accessed conversion data as said address signal to the address register associated with said A/D means.

12. The improvement as in claim 11 where said predetermined ratio is one so that said conversion data equals the magnitude of the output of the A/D means.

13. The improvement as in claim 12 where said image storage memory has $2^n \times 2^n$ memory locations and is completely filled by the data stored therein.

14. The improvement as in claim 11 where said predetermined ratio is 1/p where p=1, 2, 3, ....

15. The improvement as in claim 14 where p=1, 3, 5, ....

16. The improvement as in claim 14 where p=2, 4, 6, ....

17. The improvement as in claim 11 where said conversion data effects an inversion of at least one of the X and Y position signals such that as the magnitude of the output from at least one of the X and Y A/D means increases, the corresponding address signal decreases in magnitude.

18. The improvement as in claim 17 where said inversion is applied to both said X and Y position signals.

19. The improvement as in claim 11 including means for writing said conversion data into said memory matrix.

* * * * *

UNITED STATES PATENT AND TRADEMARK OFFICE
CERTIFICATE OF CORRECTION

PATENT NO. : 4,652,760

DATED : March 24, 1987

INVENTOR(S) : Shoji Kondo et al

It is certified that error appears in the above-identified patent and that said Letters Patent is hereby corrected as shown below:

On the title page assignee should read

--(73) Assignee: Hitachi Medical Corporation, Tokyo, Japan --.

Signed and Sealed this

Thirteenth Day of October, 1987

Attest:

DONALD J. QUIGG

*Attesting Officer*  *Commissioner of Patents and Trademarks*